(12) United States Patent
Lebaredian et al.

(10) Patent No.: US 12,211,005 B2
(45) Date of Patent: Jan. 28, 2025

(54) PLATFORM AND METHOD FOR COLLABORATIVE GENERATION OF CONTENT

(71) Applicant: Nvidia Corporation, Santa Clara, CA (US)

(72) Inventors: Rev Lebaredian, Los Gatos, CA (US); Michael Kass, San Jose, CA (US); Brian Harris, Santa Clara, CA (US); Andrey Shulzhenko, Santa Clara, CA (US); Dmitry Duka, Santa Clara, CA (US)

(73) Assignee: NVIDIA Corporation, Santa Clara, CA (US)

(*) Notice: Subject to any disclaimer, the term of this patent is extended or adjusted under 35 U.S.C. 154(b) by 761 days.

(21) Appl. No.: 16/538,594

(22) Filed: Aug. 12, 2019

(65) Prior Publication Data

US 2020/0051030 A1 Feb. 13, 2020

Related U.S. Application Data

(60) Provisional application No. 62/717,730, filed on Aug. 10, 2018.

(51) Int. Cl.
*G06Q 10/10* (2023.01)
*G06T 15/00* (2011.01)
(Continued)

(52) U.S. Cl.
CPC ......... *G06Q 10/103* (2013.01); *G06T 15/005* (2013.01); *G06T 19/003* (2013.01); *G06T 19/20* (2013.01); *G06T 2219/024* (2013.01)

(58) Field of Classification Search
CPC ... G06T 19/20; G06T 2219/024; G06T 19/00; G06T 2210/61; G06T 13/00;
(Continued)

(56) References Cited

U.S. PATENT DOCUMENTS 5,561,752 A 10/1996 Jevans
5,862,325 A 1/1999 Reed et al.
(Continued)

FOREIGN PATENT DOCUMENTS

CN 102413164 A 4/2012
CN 103890815 A 6/2014
(Continued)

OTHER PUBLICATIONS

"3D virtual reality space sharing method, 3D virtual reality space sharing system, address management method, and address management server terminal", published on Dec. 20, 2006, Document ID: JP-3859018-B2, pp. 33. (Year: 2006).*

(Continued)

*Primary Examiner* — Chau T Nguyen
(74) *Attorney, Agent, or Firm* — Taylor English Duma L.L.P.

(57) ABSTRACT

A cloud-centric platform is used for generating virtual three-dimensional (3D) content, that allows users to collaborate online and that can be connected to different software tools (applications). Using the platform, virtual environments (e.g., scenes, worlds, universes) can be created, accessed, and interacted with simultaneously by multiple collaborative content creators using varying content creation or development applications.

46 Claims, 7 Drawing Sheets

(51) Int. Cl.
*G06T 19/00* (2011.01)
*G06T 19/20* (2011.01)

(58) Field of Classification Search
CPC ... G06T 15/005; G06T 19/003; G06Q 10/101;
G06Q 10/103; G06Q 30/0601; G06F
3/167; G06F 40/216; G06F 40/30; G06F
40/35; G06F 17/50; G06F 17/5086; G06F
3/04845
See application file for complete search history.

(56) References Cited

U.S. PATENT DOCUMENTS

| | | | |
|---|---|---|---|
| 5,896,139 A | 4/1999 | Strauss | |
| 5,978,582 A | 11/1999 | McDonald et al. | |
| 5,986,667 A | 11/1999 | Jevans | |
| 6,154,215 A | 11/2000 | Hopcroft et al. | |
| 6,263,496 B1 | 7/2001 | Meyer et al. | |
| 6,272,650 B1 | 8/2001 | Meyer et al. | |
| 6,345,288 B1 | 2/2002 | Reed et al. | |
| 6,366,933 B1 | 4/2002 | Ball et al. | |
| 6,377,263 B1 | 4/2002 | Falacara et al. | |
| 6,377,309 B1 | 4/2002 | Ito et al. | |
| 6,570,564 B1 | 3/2003 | Sowizral et al. | |
| 6,557,012 B1 | 4/2003 | Arun et al. | |
| 6,598,059 B1 | 7/2003 | Vasudevan et al. | |
| 6,611,262 B1 | 8/2003 | Suzuki | |
| 6,856,322 B1 | 2/2005 | Marrin et al. | |
| 7,013,469 B2 | 3/2006 | Smith et al. | |
| 7,088,374 B2 | 8/2006 | David et al. | |
| 7,181,731 B2 | 2/2007 | Pace et al. | |
| 7,870,538 B2 | 1/2011 | Zenz et al. | |
| 8,117,192 B1 | 2/2012 | Pogodin | |
| 8,352,443 B1 | 1/2013 | Polson et al. | |
| 8,369,564 B2 | 2/2013 | Hervas et al. | |
| 8,441,496 B1 | 5/2013 | Maguire | |
| 8,612,485 B2 | 12/2013 | Selan et al. | |
| 8,620,959 B1 | 12/2013 | Denton, III et al. | |
| 8,624,898 B1 | 1/2014 | Bugaj et al. | |
| 8,782,637 B2 | 7/2014 | Khalid | |
| 9,355,478 B2 | 5/2016 | Simon et al. | |
| 9,378,296 B2 | 6/2016 | Clarke | |
| 9,430,229 B1 | 8/2016 | Van Zijst et al. | |
| 9,535,969 B1 | 1/2017 | Epstein et al. | |
| 9,557,968 B1 | 1/2017 | Smith et al. | |
| 9,569,875 B1 | 2/2017 | Milliron et al. | |
| 9,582,247 B1 | 2/2017 | Milliron et al. | |
| 9,659,398 B2 | 5/2017 | Liou et al. | |
| 9,762,663 B2 | 9/2017 | Losacco et al. | |
| 9,953,009 B1 | 4/2018 | Behar et al. | |
| 10,152,489 B2 | 12/2018 | Pola | |
| 10,217,185 B1* | 2/2019 | Cabanero | H04L 67/01 |
| 10,297,064 B2 | 5/2019 | Papp et al. | |
| 10,339,120 B2 | 7/2019 | Davidson et al. | |
| 10,353,529 B2 | 7/2019 | Xu | |
| 10,437,239 B2 | 10/2019 | Bowman et al. | |
| 10,620,948 B2 | 4/2020 | Brebner | |
| 10,679,414 B2 | 6/2020 | Jacobson et al. | |
| 10,728,291 B1 | 7/2020 | Bushkin et al. | |
| 10,789,244 B1 | 9/2020 | Yan | |
| 11,321,012 B2 | 5/2022 | Horns et al. | |
| 11,349,294 B2 | 5/2022 | Zhou et al. | |
| 11,463,250 B2 | 10/2022 | Losacco et al. | |
| 11,582,485 B1 | 2/2023 | Cherian et al. | |
| 11,635,908 B2 | 4/2023 | Switzer et al. | |
| 11,683,395 B2 | 6/2023 | Mladin et al. | |
| 11,693,880 B2 | 7/2023 | Switzer et al. | |
| 11,712,628 B2 | 8/2023 | Bar-Zeev et al. | |
| 12,100,112 B2 | 9/2024 | Lebaredian et al. | |
| 2001/0027388 A1 | 10/2001 | Beverina et al. | |
| 2002/0063704 A1 | 5/2002 | Sowizral et al. | |
| 2002/0089508 A1 | 7/2002 | Sowizral et al. | |
| 2002/0095454 A1 | 7/2002 | Reed et al. | |
| 2002/0116702 A1 | 8/2002 | Aptus et al. | |
| 2003/0132937 A1 | 7/2003 | Schneider et al. | |
| 2003/0174796 A1 | 9/2003 | Isozaki | |
| 2003/0204592 A1 | 10/2003 | Crouse-Kemp et al. | |
| 2004/0024898 A1 | 2/2004 | Wan | |
| 2004/0044998 A1 | 3/2004 | Wildhagen et al. | |
| 2004/0103141 A1 | 5/2004 | Miller et al. | |
| 2004/0189645 A1 | 9/2004 | Beda et al. | |
| 2004/0189667 A1 | 9/2004 | Beda et al. | |
| 2004/0189668 A1 | 9/2004 | Beda et al. | |
| 2005/0035970 A1 | 2/2005 | Wirtschafter et al. | |
| 2005/0039176 A1 | 2/2005 | Fournie | |
| 2005/0140694 A1 | 6/2005 | Subramanian et al. | |
| 2005/0193408 A1 | 9/2005 | Sull et al. | |
| 2005/0203927 A1 | 9/2005 | Sull et al. | |
| 2005/0212803 A1 | 9/2005 | Peachey | |
| 2005/0262470 A1 | 11/2005 | Gavrilov et al. | |
| 2006/0015494 A1 | 1/2006 | Keating et al. | |
| 2006/0041842 A1 | 2/2006 | Loberg | |
| 2006/0112167 A1 | 5/2006 | Steele et al. | |
| 2006/0271603 A1* | 11/2006 | Mathias | G06F 16/1794 |
| 2007/0094325 A1 | 4/2007 | Ih et al. | |
| 2007/0135106 A1 | 6/2007 | Sung et al. | |
| 2007/0208992 A1* | 9/2007 | Koren | G06Q 10/10 715/212 |
| 2007/0256055 A1 | 11/2007 | Herscu | |
| 2007/0294270 A1 | 12/2007 | Gregory et al. | |
| 2007/0299825 A1 | 12/2007 | Rush et al. | |
| 2008/0104206 A1 | 5/2008 | Novik et al. | |
| 2008/0122838 A1 | 5/2008 | Hoover et al. | |
| 2008/0177782 A1 | 7/2008 | Poston et al. | |
| 2008/0195759 A1 | 8/2008 | Novik et al. | |
| 2008/0278482 A1 | 11/2008 | Farmanbar et al. | |
| 2009/0006553 A1 | 1/2009 | Grandhi | |
| 2009/0077002 A1 | 3/2009 | Clark et al. | |
| 2009/0102846 A1 | 4/2009 | Flockermann et al. | |
| 2009/0172101 A1* | 7/2009 | Arthursson | G06F 3/0486 709/205 |
| 2009/0199090 A1 | 8/2009 | Poston et al. | |
| 2009/0249290 A1 | 10/2009 | Jenkins et al. | |
| 2009/0327219 A1 | 12/2009 | Finn et al. | |
| 2010/0010967 A1 | 1/2010 | Muller | |
| 2010/0083172 A1 | 4/2010 | Breeds et al. | |
| 2010/0106705 A1 | 4/2010 | Rush et al. | |
| 2010/0134501 A1 | 6/2010 | Lowe et al. | |
| 2010/0146085 A1 | 6/2010 | Van Wie et al. | |
| 2010/0150526 A1 | 6/2010 | Rose et al. | |
| 2010/0177104 A1 | 7/2010 | Dufour et al. | |
| 2010/0214284 A1 | 8/2010 | Rieffel et al. | |
| 2010/0235321 A1 | 9/2010 | Shukla et al. | |
| 2010/0257463 A1 | 10/2010 | Ducheneaut et al. | |
| 2010/0283795 A1 | 11/2010 | Deffeyes | |
| 2010/0302249 A1 | 12/2010 | Fowler et al. | |
| 2011/0047217 A1 | 2/2011 | Arnaud et al. | |
| 2011/0055732 A1 | 3/2011 | Dawson et al. | |
| 2012/0167193 A1 | 6/2012 | Gargaro et al. | |
| 2012/0236842 A1 | 9/2012 | De Foy et al. | |
| 2012/0278386 A1 | 11/2012 | Losacco et al. | |
| 2012/0331061 A1* | 12/2012 | Lininger | G06F 30/13 709/205 |
| 2013/0010421 A1 | 1/2013 | Fahey et al. | |
| 2013/0038618 A1 | 2/2013 | Urbach | |
| 2013/0080349 A1 | 3/2013 | Bhola et al. | |
| 2013/0120421 A1 | 5/2013 | Maguire | |
| 2013/0120422 A1 | 5/2013 | Rao et al. | |
| 2013/0132466 A1* | 5/2013 | Miller | G06F 16/972 709/203 |
| 2013/0185198 A1 | 7/2013 | Lorch | |
| 2013/0218829 A1 | 8/2013 | Martinez | |
| 2013/0246513 A1 | 9/2013 | Zaveri et al. | |
| 2013/0246901 A1 | 9/2013 | Massand | |
| 2013/0246932 A1 | 9/2013 | Zaveri et al. | |
| 2013/0339723 A1 | 12/2013 | Hix et al. | |
| 2014/0022986 A1 | 1/2014 | Wu et al. | |
| 2014/0108485 A1 | 4/2014 | Geibel et al. | |
| 2014/0181789 A1 | 6/2014 | Canter et al. | |
| 2014/0222919 A1 | 8/2014 | Nysetvold et al. | |
| 2014/0229865 A1* | 8/2014 | Da Costa | G06Q 10/101 715/757 |
| 2014/0236550 A1 | 8/2014 | Nysetvold et al. | |
| 2014/0258373 A1 | 9/2014 | Lerman | |

(56) References Cited

U.S. PATENT DOCUMENTS

| | | |
|---|---|---|
| 2014/0267237 A1 | 9/2014 | McNerney et al. |
| 2014/0267239 A1 | 9/2014 | Wilson et al. |
| 2014/0279903 A1 | 9/2014 | Hsiao et al. |
| 2014/0279976 A1 | 9/2014 | Davidson et al. |
| 2014/0292781 A1 | 10/2014 | Flototto et al. |
| 2014/0297759 A1 | 10/2014 | Mody |
| 2014/0337734 A1 | 11/2014 | Bradford et al. |
| 2015/0054823 A1 | 2/2015 | Dzhurinskiy et al. |
| 2015/0074181 A1 | 3/2015 | Taerum et al. |
| 2015/0010675 A1 | 4/2015 | Konami et al. |
| 2015/0106750 A1 | 4/2015 | Konami et al. |
| 2015/0106790 A1 | 4/2015 | Bigwood et al. |
| 2015/0220332 A1 | 8/2015 | Bernstein et al. |
| 2015/0220636 A1 | 8/2015 | Deen et al. |
| 2015/0221336 A1 | 8/2015 | Deen et al. |
| 2015/0222730 A1 | 8/2015 | Gower et al. |
| 2015/0301837 A1 | 10/2015 | Goetz et al. |
| 2016/0063753 A1 | 3/2016 | Peterson et al. |
| 2016/0070767 A1 | 3/2016 | Karras et al. |
| 2016/0098494 A1 | 4/2016 | Webster et al. |
| 2016/0210602 A1* | 7/2016 | Siddique .............. G06Q 10/101 |
| 2016/0283571 A1 | 9/2016 | Gatzsche et al. |
| 2016/0307353 A1 | 10/2016 | Ligenza et al. |
| 2017/0024447 A1 | 1/2017 | Bowman, Jr. et al. |
| 2017/0132567 A1* | 5/2017 | Glunz ................ G06Q 10/101 |
| 2017/0132568 A1* | 5/2017 | Glunz ................ G06Q 10/101 |
| 2017/0132842 A1 | 5/2017 | Morrison |
| 2017/0153926 A1 | 6/2017 | Callegari et al. |
| 2017/0180756 A1 | 6/2017 | Tuffreau et al. |
| 2017/0235568 A1 | 8/2017 | Cowan et al. |
| 2017/0264592 A1 | 9/2017 | Yoda et al. |
| 2017/0285896 A1* | 10/2017 | Chandra ................ G06F 40/30 |
| 2018/0060065 A1 | 3/2018 | Lai et al. |
| 2018/0107455 A1 | 4/2018 | Psistakis |
| 2018/0121530 A1 | 5/2018 | McGregor et al. |
| 2018/0225885 A1 | 8/2018 | Dishno |
| 2018/0286116 A1 | 10/2018 | Babu J D |
| 2018/0307794 A1 | 10/2018 | Bowman et al. |
| 2018/0322692 A1 | 11/2018 | Babu J D |
| 2018/0373502 A1 | 12/2018 | Ganninger et al. |
| 2018/0373770 A1 | 12/2018 | Switzer et al. |
| 2019/0035138 A1 | 1/2019 | Fuetterling |
| 2019/0121874 A1 | 4/2019 | Vilim et al. |
| 2019/0149619 A1 | 5/2019 | Lisac et al. |
| 2019/0188911 A1 | 6/2019 | Jacobson et al. |
| 2019/0197785 A1 | 6/2019 | Tate-Gans et al. |
| 2019/0278459 A1 | 9/2019 | da Costa et al. |
| 2019/0340166 A1 | 11/2019 | Raman et al. |
| 2019/0340333 A1 | 11/2019 | Srinivasan et al. |
| 2019/0340832 A1 | 11/2019 | Srinivasan et al. |
| 2019/0340834 A1 | 11/2019 | Martinez Molina et al. |
| 2019/0346819 A1 | 11/2019 | Kroner et al. |
| 2019/0349624 A1 | 11/2019 | Rodriguez et al. |
| 2019/0355181 A1 | 11/2019 | Srinivasan et al. |
| 2020/0035026 A1 | 1/2020 | Demirchian et al. |
| 2020/0036816 A1 | 1/2020 | Babu et al. |
| 2020/0051030 A1 | 2/2020 | Lebaredian et al. |
| 2020/0117705 A1 | 4/2020 | Hance et al. |
| 2020/0204739 A1 | 6/2020 | Beres et al. |
| 2020/0210488 A1 | 7/2020 | Centurion |
| 2020/0285464 A1 | 9/2020 | Brebner |
| 2020/0285788 A1 | 9/2020 | Brebner |
| 2020/0285977 A1 | 9/2020 | Brebner |
| 2020/0320764 A1 | 10/2020 | Bryson |
| 2020/0326936 A1 | 10/2020 | Sigmon et al. |
| 2020/0334917 A1 | 10/2020 | Dzhurinskiy et al. |
| 2020/0364042 A1 | 11/2020 | Wuensche |
| 2020/0394263 A1 | 12/2020 | Ganu et al. |
| 2020/0404218 A1 | 12/2020 | Yerli |
| 2021/0049827 A1 | 2/2021 | Lebaredian et al. |
| 2021/0056762 A1 | 2/2021 | Robbe et al. |
| 2021/0073287 A1 | 3/2021 | Hunter |
| 2021/0097061 A1 | 4/2021 | Amihod et al. |
| 2021/0157970 A1 | 5/2021 | Behar et al. |
| 2021/0248115 A1 | 8/2021 | Jones et al. |
| 2021/0248789 A1 | 8/2021 | Du |
| 2021/0255853 A1 | 8/2021 | Zhou et al. |
| 2021/0275918 A1 | 9/2021 | Devaranjan et al. |
| 2021/0382708 A1 | 12/2021 | Sagal et al. |
| 2021/0382709 A1 | 12/2021 | Sagal et al. |
| 2021/0390760 A1 | 12/2021 | Muthler et al. |
| 2022/0020201 A1 | 1/2022 | Fenney |
| 2022/0101619 A1 | 3/2022 | Lebaredian et al. |
| 2022/0150419 A1 | 5/2022 | Beres et al. |
| 2022/0171654 A1 | 6/2022 | Jones et al. |
| 2022/0215343 A1 | 7/2022 | Bever et al. |
| 2022/0277514 A1 | 9/2022 | Mn et al. |
| 2022/0309743 A1 | 9/2022 | Harviainen |
| 2022/0337919 A1 | 10/2022 | Yip et al. |
| 2023/0093087 A1 | 3/2023 | Babinowich et al. |
| 2023/0132703 A1 | 5/2023 | Marsenic et al. |
| 2023/0152598 A1 | 5/2023 | Brebner et al. |
| 2023/0177594 A1 | 6/2023 | Besecker et al. |
| 2023/0336830 A1 | 10/2023 | Yerli |

FOREIGN PATENT DOCUMENTS

| | | | | |
|---|---|---|---|---|
| CN | 104183023 A | | 12/2014 | |
| CN | 107408142 A | * | 11/2017 | .............. G06F 17/50 |
| GB | 2472898 A | * | 2/2011 | .............. G06F 16/41 |
| WO | WO-2013024397 A1 | * | 2/2013 | ......... G06F 3/04817 |
| WO | 2019183593 A1 | | 9/2019 | |
| WO | 2020/033969 A1 | | 2/2020 | |

OTHER PUBLICATIONS

Honda Yasuaki (Yasuaki), "Method and system for three-dimensional virtual reality space, medium and method for recording information, medium and method for transmitting information, information processing method . . . ", published on Mar. 28, 1997, Document ID: JP-H0981782-A, pp. 35. (Year: 1997).*

Clarke Simon P. Rasmussen David, Kofman Igor, "Method and System for Synchronizing Change Made by a Plurality of Users on Shared Object", published on Jul. 27, 2006, Document ID: JP-2006195972-A, pp. 15 (Year: 2006).*

Preinterview First Office Action dated Jan. 22, 2021 in U.S. Appl. No. 16/826,269, 5 pages.

International Preliminary Report on Patentability received for PCT Application No. PCT/US2019/046218, mailed on Feb. 25, 2021, 8 pages.

International Search Report and Written Opinion in International Application No. PCT/US2019/046218 mailed Oct. 30, 2019. 10 pages.

First Action Interview Office Action dated May 10, 2021 in U.S. Appl. No. 16/826,269, 4 pages.

Introduction to USD, 2017, pixar.com. Available at: https://graphics.pixar.com/usd/docs/index.html.

Watch a Jaw Dropping Example of Universal Scene Description, lesterbanks.com, Sep. 3, 2016. Available at: http://lesterbanks.com/2016/09/jaw-dropping-universal-scene-description/.

Ellis, C. A., et al., "Concurrency Control in Groupware Systems.", in Proceedings of The 1989 ACM SIGMOD International Conference on Management of Data, pp. 1-9 (Jun. 1989).

Georgiev, L., et al., "Autodesk Standard Surface.", Retrieved From the Internet on Mar. 23, 2020, pp. 1-29, at URL: https://autodesk.github.io/standard-surface/.

He, Y., et al., "Slang: Language Mechanisms for Extensible Real-Time Shading Systems.", ACM Transactions on Graphics (TOG), 37(4), pp. 1-13 (2018).

Newman, R., "Beginner's Guide to Techniques for Refreshing Web Pages: Ajax, Comet, HTML5.", Retrieved From the Internet on Mar. 23, 2020, pp. 1-7, at URL: https://richnewman.wordpress.com/2012/09/08/beginners-guide-to-techniques-for-refreshing-web-pages-ajax-comethtml5/.

Parker, S. G., et al., "Optix: A General-Purpose Ray Tracing Engine.", ACM Transactions on Graphics, vol. 29(4), pp. 1-13 (2010).

Shapiro, M., et al., "Conflict-Free Replicated Data Types.", in Symposium on Self-Stabilizing Systems, pp. 1-22 (Oct. 2011).

(56) References Cited

OTHER PUBLICATIONS

Notice of Allowance dated Sep. 7, 2021 in U.S. Appl. No. 16/826,269, 10 pages.
Lebaredian, Lev; Non-Final Office Action for U.S. Appl. No. 17/542,041, filed Dec. 3, 2021, mailed Jan. 27, 2023, 41 pgs.
Lebaredian, Rev; Non-Final Office Action for U.S. Appl. No. 17/088,490, filed Nov. 3, 2020, mailed May 11, 2023, 64 pgs.
Lebaredian, et al.; First Office Action for Chinese Patent Application No. 201980066854.0, filed Apr. 9, 2021, mailed Jun. 26, 2023, 9 pgs.
Lebaredian, et al.; Final Office Action for U.S. Appl. No. 17/542,041, filed Dec. 3, 2021, mailed Aug. 15, 2023, 50 pgs.
Lebaredian, Rev; Final Office Action for U.S. Appl. No. 17/088,490, filed Nov. 3, 2020, mailed Nov. 6, 2023, 76 pgs.
Lebaredian, Rev; Second Office Action for Chinese Patent Application No. 201980066854.0, filed Apr. 9, 2021, mailed Jan. 31, 2024, 4 pgs.
Lebaredian, Rev; First Office Action for Chinese Patent Application No. 202111294754.9, filed Nov. 3, 2021, mailed Feb. 8, 2024, 10 pgs.
Lebaredian, Rev; Notice of Allowance for U.S. Appl. No. 17/542,041, filed Dec. 3, 2021, mailed May 31, 2024, 19 pgs.
Lebaredian, Rev; Second Office Action for Chinese Patent Application No. 202111294754.9, filed Nov. 3, 2021, mailed Jun. 28, 2024, 7 pgs. **English Abstract Included.
Lebaredian, Rev; Notice of Registration for Chinese Patent Application No. 201980066854.0, filed Apr. 9, 2021, mailed Apr. 25, 2024, 6 pgs.
Lebaredian, Rev; Non-Final Office Action for U.S. Appl. No. 17/542,041, filed Dec. 3, 2021, mailed Jan. 25, 2024, 42 pgs.
Lebaredian, Rev; Non-Final Office Action for U.S. Appl. No. 17/088,490, filed Nov. 3, 2020, mailed Feb. 29, 2024, 47 pgs.
Lebaredian, Rev; Final Office Action for U.S. Appl. No. 17/088,490, filed Nov. 3, 2020, mailed Sep. 16, 2024, 74 pgs.

* cited by examiner

PLATFORM AND METHOD FOR COLLABORATIVE GENERATION OF CONTENT

RELATED U.S. APPLICATION

This application claims priority to U.S. Provisional Application No. 62/717,730, titled "Cloud-Centric Platform for Collaboration and Connectivity," filed on Aug. 10, 2018, and U.S. Provisional Application No. 62/879,901, titled "Real-Time Ray-Tracing Renderer," filed on Jul. 29, 2019, incorporated by reference in its entirety.

BACKGROUND

Making high-quality three-dimensional (3D) worlds is difficult. Historically, 3D content creation pipelines (e.g., games, film, etc.) have been mostly linear. Due to concerns over consistency and fidelity, multiple content creators cannot work on the same asset simultaneously. Due to these constraints, large or immersive worlds are difficult, if not impossible. World size in particular has been historically limited due to the necessity of assets being client-side of each content-creator.

3D content is in high demand (e.g., for training autonomous vehicles and robots, for augmented reality, virtual reality, design, etc.). However, only a relatively small number of people or organizations have the skills and/or tools to make high-quality 3D worlds. In addition, the complexity of producing high quality 3D content is increasing as the number of contributions from traditionally distinct departments (e.g., 3D object modeling, world modeling, animation, physics, rendering, etc.) required to make 3D content that is vibrant, interesting, and attractive to consumers also continues to rise—all while the line among content creators, and even between content creators and content consumers, continues to blur.

SUMMARY

Disclosed is, in general, a cloud-centric platform for generating virtual three-dimensional (3D) content that allows users to collaborate online and that can be connected to different software tools (applications). Using the platform, virtual environments (e.g., scenes, worlds, universes) can be created, accessed, and interacted with.

In embodiments, a server includes a database that stores assets comprising three-dimensional data useful for generating a virtual environment (e.g., a virtual scene), and also includes a synchronizer. The synchronizer can synchronize a change made by a client coupled to the server and data of the assets to include the change in the database, and can also synchronize changes in the database and data of clients coupled to the server.

The clients interoperate with each other to produce and modify the virtual environment. The clients include different types of clients that can operate on an object of the virtual environment in different ways.

In operation, in an embodiment, a first change to a first element of an asset is generated by a first application. The first element is updated in the database to include the first change. The first change is provided from the database to a second application. In response to the first change, a second change can be generated by the second application, in which case the database is updated to include the second change.

The platform thus allows collaborative, Web-based real-time editing through a published interface so that clients that are subscribers to an asset can work together on that asset or object. Subscribers can work together at the same time or at different times while a version control system is used to manage changes to maintain the integrity and fidelity of the work product from potentially multiple simultaneous accesses and/or collaborators.

From the point of view of the server and database, updates to an asset are provided from the clients as incremental updates (deltas) to the previous version of the asset. From the point of view of a client, updates to an asset from the server are also provided as deltas to the previous version of the asset. Consequently, network traffic and the computational loads on server and client devices are reduced. This advantageously provides the ability to perform bidirectional real-time updates between the clients and server for dynamic, complex virtual environments. Modifications to an environment can happen live, in real-time.

These and other objects and advantages of the various embodiments according to the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "saving," "changing," "updating," "synchronizing," "providing," "performing," "making a change," "generating," "rendering," "identifying," "loading," "resolving," "displaying," "assembling," "accumulating," "receiving," "sending," or the like, refer to actions and processes of an apparatus or computer system or similar electronic computing device or processor. A computer system or similar electronic computing device manipulates and transforms data represented as physical (electronic) quantities within memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory (e.g., a solid-state drive) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Overview

Disclosed is, in general, a cloud-centric platform for generating virtual three-dimensional (3D) content, that allows users to collaborate online and that can be connected to different software tools (applications). Using the platform, virtual environments (e.g., scenes, worlds, universes) can be created, accessed, and interacted with.

In embodiments, one or more applications (e.g., Web-based applications) are communicatively coupled to a database that can be accessed, edited, and stored. A wide variety of third-party applications can connect as seamlessly as possible or practicable with the database, and vice versa, through well-designed application programming interfaces (APIs). In embodiments, at least one of the applications is a 3D content creation application (e.g., an animation tool or a computer graphics application such as Autodesk Maya®).

In embodiments, the database is based on the Universal Scene Description (USD) format and schema. The entries or elements in the database are referred to herein as "assets." Objects in a virtual 3D environment, and the virtual environment itself, can be composed from one or more of the elemental assets. The database can be queried and updated using the applications. Appropriate plug-ins are created and used for applications, to allow those applications to operate smoothly for real-time editing.

As will be described in greater detail, each application interacts with certain attributes or properties of objects that can be described or defined using the assets in the database. For example, a graphics editor (e.g., Photoshop®) can be connected to the database (to an asset in the database) using a plug-in to add a texture to an object in a virtual scene, while a computer graphics application or animation tool (e.g., Autodesk Maya®) can be connected to the database (to an asset in the database) using a plug-in to animate that object (or a different object) in the virtual scene. In other words, an object created with a first application such as Maya® can have associated properties understood only by that application, but the disclosed platform supports the ability for a second application (e.g., Photoshop®) to make changes to that object, while advantageously leaving the properties understood only by the first application undisturbed. The two applications can thus interoperate, essentially interacting with each other, without being directly connected to each other or being aware of each other. More than two applications can interoperate or collaborate in this manner.

Subscribers can identify what assets or objects are of interest to them, and make changes where they have permission to do so. The platform allows collaborative, Web-based real-time editing through a published interface so that subscribers to an asset can work together on that asset or object. Subscribers can work together at the same time or at different times. A version control system is used to manage changes.

Platform and Method for Collaborative Generation of Content

Figure 1:
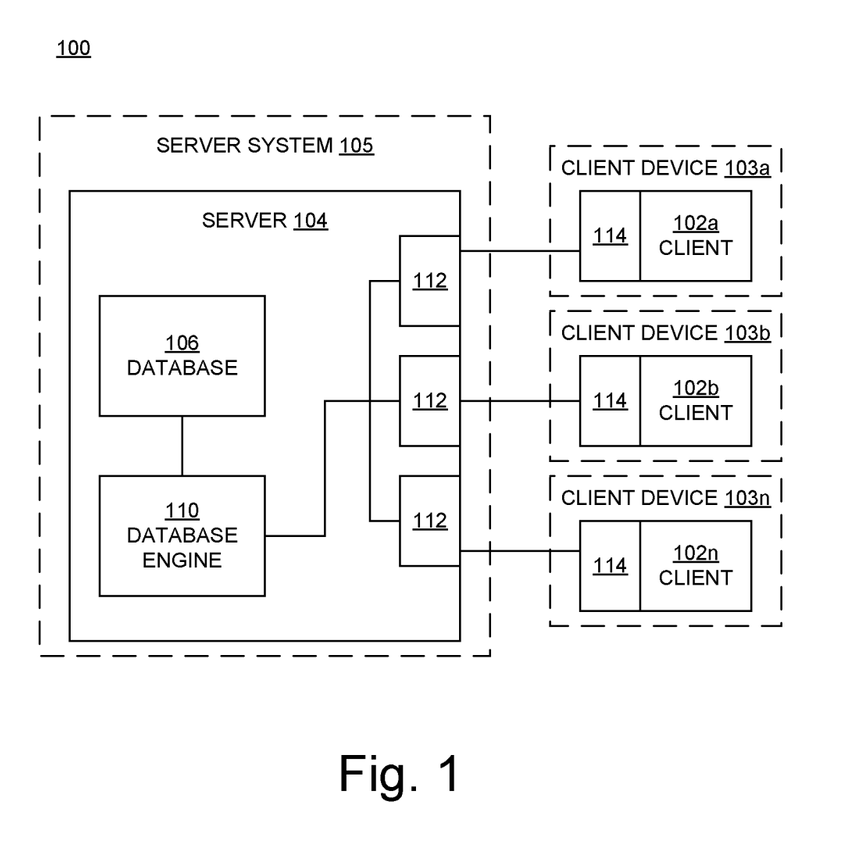
FIG. 1 is a block diagram illustrating a platform for collaboratively generating virtual 3D content in embodiments according to the present invention.

FIG. 1 is a block diagram illustrating a platform 100 for collaboratively generating virtual 3D content in embodiments according to the present invention. The platform 100 can be implemented as computer-executable components stored in non-transitory computer-readable media.

In embodiments, the platform 100 includes a system of clients 102a-n, which are applications or software tools that can be executed on or using one or more computing systems (the client devices or systems 103a-n). The client devices 103a-n can include different types of devices; that is, they may have different computational and display capabilities and different operating systems, for example. Depending on their hardware and software capabilities, the client devices 103a-n may be referred to as either a thick client or a thin client.

The platform 100 also includes a server 104 communicatively coupled to the clients 102a-n. The server 104 can be executed on or using one or more computing systems (e.g., the server system 105).

Generally speaking, in embodiments, the platform 100 is implemented as a cloud-centric platform; that is, it is a Web-based platform that can be implemented using one or more devices connected and working cooperatively via a network (e.g., the Internet).

In an embodiment, each of the clients 102a-n connects to the server 104 through a port or socket 112, and communicates with the server using a common application programming interface (API) that enables bidirectional communication (e.g., the WebSockets API). The clients 102a-n include different types of applications such as, but not limited to: a physics simulation application, an artificial intelligence (AI) application, a global illumination (GI) application, a game engine, a computer graphics application, a renderer, a graphics editor, a virtual reality (VR) application, an augmented reality application, and a scripting application. Because they are different from each other, the clients 102a-n can be called "heterogeneous clients." The clients 102a-n may also be referred to as "microservices."

In embodiments, the server 104 includes a database 106. Although referred to singularly as a database, the database 106 can include multiple databases that are implemented and stored on one or more computing systems (e.g., a datacenter). The database 106 stores data representative of assets. Each asset stores 3D data that can be used with other assets to compose a virtual scene. Virtual scenes can be combined to form virtual worlds or universes. In general, the term "virtual environment" is used herein to refer to a virtual scene, world, or universe. Use cases include, but are not limited to: design reviews for product design and architecture; scene generation; scientific visualization (SciVis); automobile simulation (e.g., AutoSIM); cloud versions of games; virtual set production; and social VR with user-generated content and elaborate worlds.

There may be different servers inside the platform 100 for different virtual environments, and the owner of a virtual environment may make choices about the way the environment is constructed and which resources are provided in order to provide the most relevant and important scalability.

Each asset in the database 106 can be accessed and optionally changed by one or more of the clients 102a-n. In an embodiment, the clients 102a-n are connected to the database using a respective plug-in 114. However, in embodiments, access to an asset is limited to clients that subscribe to that asset, and a change to an asset can only be made by a subscriber that has permission to do so.

Not all of the clients 102a-n are applications that can make changes to assets in the database 106. For example, the clients 102a-n may include applications that render an asset or environment, and may include applications that display an asset or environment.

The platform 100 leverages the cloud. The platform 100 factors out asset storage, editing, and querying into a cloud service (the database 106). The platform 100 allows virtually any application to connect to the server 104.

In embodiments, the server 104 also includes a synchronizer 108. As mentioned above, one or more of the clients 102a-n can make changes to an asset. The synchronizer 108 synchronizes those changes with the data of the asset, and also synchronizes the data of the changed (updated) asset with other clients interested in that asset (e.g., other subscribers to the asset).

More specifically, in embodiments, an asset can be loaded across a network from the server 104 to a first client 102a. The client 102a can make a change or changes (an update) to the asset. In embodiments according to the invention, after the update is made, the client 102a advantageously loads and saves to the database 106 only the update to the asset. That is, the client 102a does not return the entire, updated asset to the database 106; instead, the client 102a saves only the part(s) (e.g., object, property, attribute) of the asset that changed. In turn, the changes to the asset can be provided to one or more of the other clients 102b-n that, for example, subscribe to that asset. That is, the database 106 does not provide the entire, updated asset to the other clients; instead, the database provides only the part(s) (e.g., object, property, attribute) of the asset that changed. The synchronization process in which only changes are shared between the database 106 and the clients 102a-n may be referred to herein as "incremental updates" or "incremental changes."

Thus, from the point of view of the server 104 (specifically, the database 106), updates to an asset are provided from the clients 102a-n as incremental changes (deltas) to the previous version of the asset; and, from the point of view of a client, updates to an asset from the server are also provided as deltas to the previous version of the asset. Consequently, network traffic and the computational loads on server and client devices are reduced. This advantageously provides the ability to perform bidirectional real-time updates between the clients 102a-n and server 104 for dynamic, complex virtual environments. Modifications to an environment can happen live, in real time. Any runtime can connect to the server 104 and see live updates to the environments.

To summarize to this point, the server 104 enables the clients 102a-n to publish and subscribe to any asset in the database 106 for which the clients have suitable permissions. In use, multiple clients 102a-n can publish and subscribe to the same set of assets, creating a shared virtual world. The database 106 operates, in essence, as a hub that allows the clients 102a-n to interoperate with each other through changes to the database. Plug-ins 114 for the clients 102a-n allow the clients to interoperate with the database 106 and with each other through the database. The clients 102a-n can be heterogeneous (different types of) applications that are able to work together through the database 106.

Updates from any one of the clients 102*a-n* can be replicated to the database 106 then to the other clients at interactive speeds.

Thus, in embodiments according to the present invention, each client (application) 102*a-n* interacts with certain attributes or properties of objects that can be described or defined using the assets in the database 106. In the example described earlier herein, a graphics editor (e.g., Photoshop®) can be connected to the database 106 (to an asset in the database) to add a texture to an object in a virtual scene, and a computer graphics application or animation tool (e.g., Autodesk Maya®) can be connected to the database (to an asset in the database) to animate that object (or a different object) in the virtual scene.

In embodiments, a change to an asset in the database 106 made by one of the clients (application) 102*a-n* prompts each subscriber to consider the change. That is, in embodiments, a subscriber processes or performs operations in response to being notified of the change or by receiving the change (e.g., by synchronizing with the database 106). For example, an animation tool (e.g., Autodesk Maya®) can be used to animate an object in a virtual scene, and a physics simulation application or physics engine (e.g., PhysX) can be used to simulate real-world physics associated with the object in the virtual scene. In this example, if the animation tool is used to, for instance, move the object over the edge of a table and updates the asset in the database 106 accordingly, then (e.g., after synchronizing with the database) the physics simulation application will automatically simulate real-world physics based on that movement (e.g., the trajectory of the falling object) and update the database accordingly. Thus, an asset in the database 106 can be changed by a type of first client, and a second client (that may be a different type of client) can also change that asset (perhaps in direct response to the change made by the first client). In this manner, two or more clients (e.g., different types of clients) can interoperate, essentially interacting with each other, to effect changes to different properties or attributes of the same asset.

However, depending on the type of client, a change to an asset provided to the client does not necessarily trigger another change to either that asset or another asset. In general, in response to being provided a change to an element of an asset, a client can make another change to that element, and update the database 106 to include the other change; make a change to another element of the asset, and update the database to include the change to the other element; use the element including any change in some type of operation that does not cause another change to the element; render the element/asset; and/or display the element/asset.

In embodiments, the platform 100 (e.g., the server 104) also includes a database engine 110 that can resolve conflicts between changes to the database 106. The database engine 110 functions as a change or version control mechanism. In an embodiment, conflicts are resolved according to a ranking assigned to the clients 102*a-n*, which may be referred to as source control. That is, if for example two clients are subscribers to an asset and both have permission to change the asset, the changes from one of the clients have priority over and would supersede any conflicting changes from the other client. Priorities can be assigned in different ways. For example, one client can have priority over one spatial portion of a virtual environment, and another client can have priority over another spatial portion of the virtual environment. In that case, if an asset appears or is used in one area of the virtual environment, then the changes from the first client would have priority over conflicting changes from the second client; but if the asset appears or is used in the other area of the virtual environment, then the changes from the second client would have priority.

As mentioned above, in embodiments, the database 106 is based on the USD format and schema. USD provides the ability to layer together a series of "opinions" about properties for collections of objects. A layer is a group of objects that are outside of a conventional tree structure of transformation hierarchy; that is, the objects may be included in different leaves of the transformation hierarchy. Layering allows properties across objects in the layer (group) to be changed. For example, the engine and the doors of a car may be represented as different objects in the transformation hierarchy; however, the engine and the doors can both include screws. Layers permit the properties of the screws to be changed no matter where the screws appear in the hierarchy. In embodiments, different client subscribers may have control over respective layers, in which case their updates take precedent over the updates of other subscribers. Different layers may be ranked higher than other layers; the ranking can be used to control which changes to a layer have priority.

Figure 2:
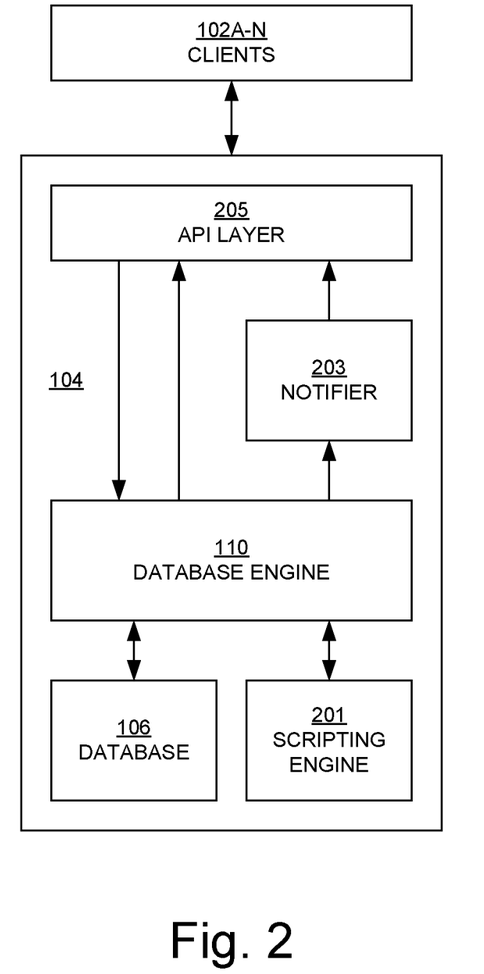
FIG. 2 is a block diagram illustrating selected components of a server in embodiments according to the present invention.

FIG. 2 is a block diagram illustrating selected components of the server 104 in embodiments according to the invention. As described above, in embodiments, the server 104 includes the database 106 and the database engine 110. Clients 102*a-n* (e.g., applications) can query and modify the database 106, for example, through an API layer 205 (e.g., the sockets 112 of FIG. 1).

In an embodiment, a scripting engine 201 runs lightweight and safe (e.g., sandboxed) scripts close to the database 106 without passing through the API layer. In an embodiment, procedural data-flow elements are created, submitted, and linked in the server 104. The individual procedural elements can be specified in ways similar to the way procedural shaders are specified.

Updates to assets in the database 106 are communicated back to clients that are subscribers to those assets. In an embodiment, a notifier 203 sends a message to the clients that subscribe to an asset when that asset is changed. In effect, notifications are filtered per client based on what is of interest to the client.

Figure 3:
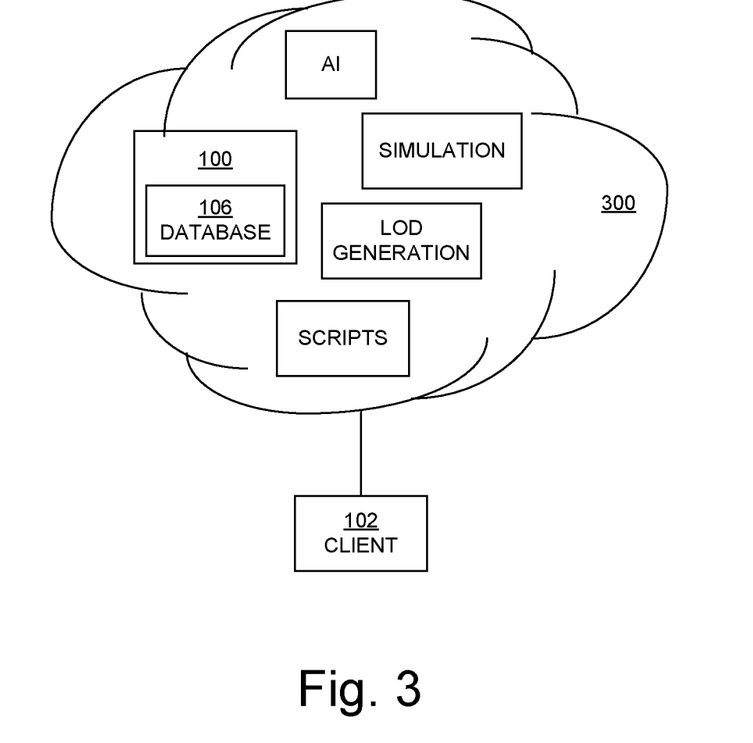
FIG. 3 is a block diagram illustrating the platform in a scalable framework (or engine) in embodiments according to the present invention.

FIG. 3 is a block diagram illustrating the platform 100 in a scalable framework (or engine) 300 in embodiments according to the present invention. The scalable framework 300 can manage and launch application-defined processes near the database 106, such as but not limited to physics simulation, AI, GI, and level-of-detail (LOD) generation.

In an embodiment, the framework 300 includes a replication engine (not shown). For speedy replication, where correctness requires locks, API calls can be used with guaranteed correctness. A client 102 can take a snapshot and get a fully correct set of data at a particular moment suitable for offline rendering at the highest quality. All relevant static assets are not necessarily preloaded. Teleporting is an important use case, and framework 300 provides the ability to go quickly to non-preloaded places. Certain applications (clients) may choose to preload all relevant assets, but that is not necessarily imposed on all applications.

In an embodiment, the framework 300 includes an API to support data-flow dependencies, caching, and re-computation, for situations where, for example, a computation depends on a set of properties, objects, or a volume of space and should be updated when they change (e.g., GI computations, LOD, and potentially visible sets).

In an embodiment, the framework 300 includes an API for spatial queries.

In an embodiment, the framework 300 includes software tools for authoring and running procedural scripting in the cloud to create behavior, including APIs for, but not limited to: registering scripts, setting up events, and triggers. These may be containerized and linked by permissions to a particular virtual environment.

In an embodiment, the framework 300 includes APIs to aid in the creation of very large worlds including APIs for, but not limited to: LODs, auto-creation of distant environment maps, and visibility culling.

Using the framework 300, cloud rendering can be provided for a wide variety of experiences. The platform 300 can be used for applications where the minimum specification of rendering power can be very high, even when sending the result to a thin (e.g., mobile) client device.

Thin VR clients are also supported by, for example, cloud rendering RGB-D videos wider than the field-of-view and also by transmitting supplemental hole-filling data from nearby viewpoints. Thus, during a period when a client has stale data, it can re-project the stale data from the new viewpoint using the depth and hole-filling data to create appropriate parallax. In a gaming application, common calculations (e.g., GI and physics) between clients can be naturally factored out. View-dependent calculations (e.g., final render, user experience (UX), physics, GI, and LOD) can be done separately in the cloud and streamed to thin clients outside the cloud.

The platform 300 can also support latency-sensitive experiences that may benefit greatly from, for example, thick clients over wide area networks (WANs), although the invention in not so limited. Massively multiplayer online games (MMOs) and their relatives are also supported.

Figure 4:
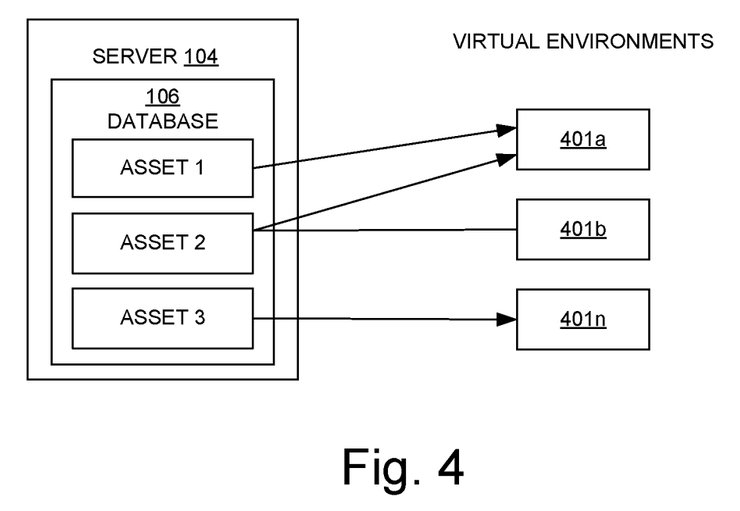
FIG. 4 is a block diagram illustrating the use of a database to create multiple virtual environments in embodiments according to the present invention.

FIG. 4 is a block diagram illustrating the use of the database 106 to create multiple virtual environments 401a-n in embodiments according to the invention. In the example of FIG. 4, assets 1-3 in the database can be referenced by different environments. Thus, for example, asset 2 is referenced by, and used to create, both of the virtual environments 401a and 401b.

Figure 5:
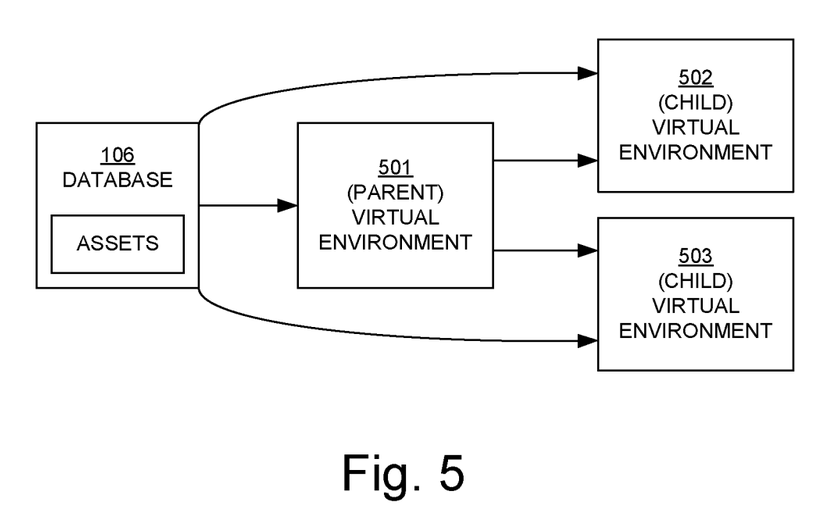
FIG. 5 is a block diagram illustrating the use of the database for virtual environment forking in embodiments according to the invention.

FIG. 5 is a block diagram illustrating the use of the database 106 for virtual environment forking in embodiments according to the invention. Forking virtual environments into multiple child environments (copies) is a relatively inexpensive (computationally) operation. References to assets in the database 106 are moved from the parent environment 501 to the child environments 502 and 503.

Figure 6:
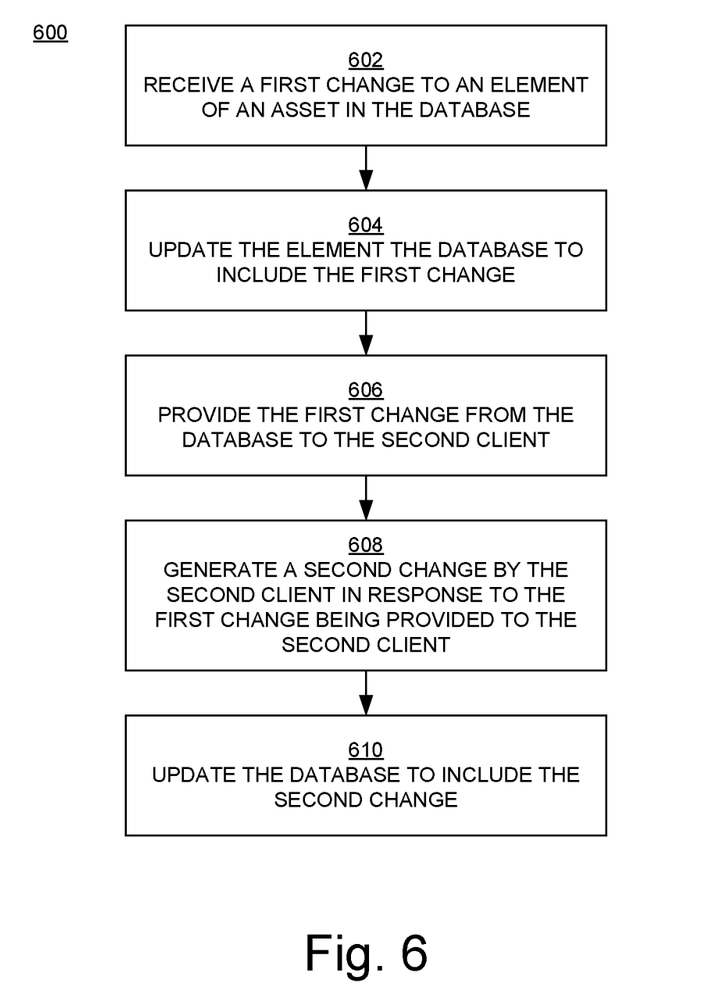
FIG. 6 is a flowchart of an example of a computer-implemented method for collaborative generation of content in embodiments according to the present invention.

FIG. 6 is a flowchart 600 of an example of a method for collaborative generation of content in embodiments according to the invention. The flowchart 600 can be implemented as computer-executable instructions residing on some form of computer-readable storage medium (e.g., in memory of the computing system 800 of FIG. 8). In embodiments according to the present invention, the method of FIG. 6 is performed by (at) the server 104 of FIG. 1. FIG. 6 is described in conjunction with FIG. 7, which is a block diagram illustrating the flow of information between the server 104 (specifically, the database 106) and two clients 102a and 102b in embodiments according to the invention. The discussion below can be readily extended to more than two clients.

Figure 7:
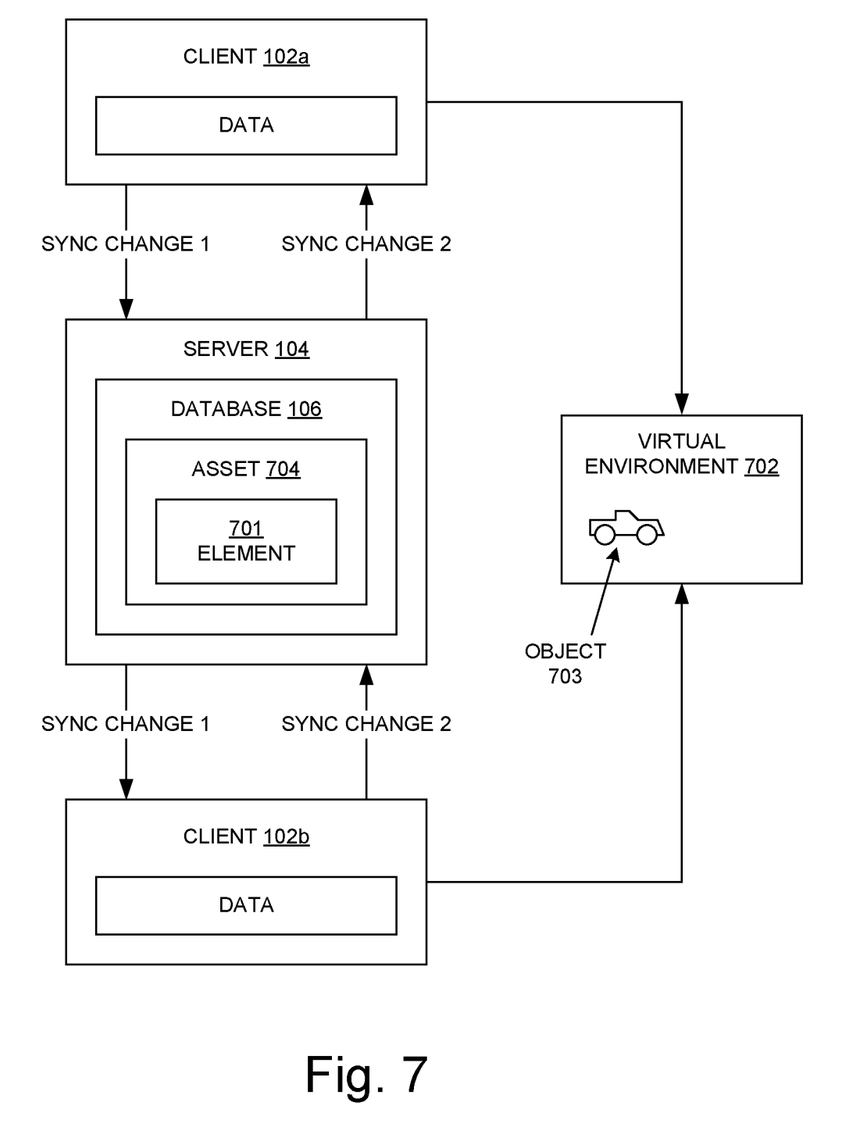
FIG. 7 is a block diagram illustrating the flow of information between the server and clients in embodiments according to the present invention.

In block 602 of FIG. 6, a first change (change 1) to an element 701 (e.g., property or attribute) of an asset 704 in the database 106 is received. The first change is generated by the first client 102a (a first application). In the example of FIGS. 6 and 7, the asset 704 (and element 701) are associated with an object 703 in a virtual environment (scene) 702. That is, a change to the element 701 can affect, for example, the appearance, position, or orientation of the object 703 in the virtual environment 702.

In block 604, the element 701 is updated in the database 106 to include the first change. In embodiments, the database 106 is updated by synchronizing the database and data of the client 102a.

In block 606, the first change is provided from the database 106 to the client 102b (a second application). In embodiments according to the invention, only the change or changes to the element 701 are provided from the database 106 to the client 102b: the entire, updated element—or the entire, updated asset 704—is not provided from the database to the client 102b. In an embodiment, the client 102b subscribes to the asset or to the element 701. In an embodiment, the clients 102a and 102b are different types of clients. The clients may be directed to different aspects of content creation or asset management, or may be used on different scales, or modalities. For example, one client may operate on one or more two-dimensional spaces, whereas another client may execute in a three-dimensional space. The same asset could appear to the first client as a series of discrete two-dimensional object geometries, whereas the latter client may visualize the asset three-dimensionally (e.g., through a virtual reality device) with perspectives of the asset that can be interactively and contiguously traversed. In an embodiment, the server 104 sends a message to the client 102b when a change to the asset or to the element 701 is saved to the database 106. In embodiments, the first change is provided by synchronizing the database 106 and data of the client 102b. The first change can also be provided to other clients that subscribe to the element 701.

In an embodiment, the second change triggers (prompts) the second client 102b to perform operations (execute) in order to process or analyze the effect (if any) of the first change. In block 608, in an embodiment, a second change (change 2) is generated by the second client 102b in response to the first change being provided to the second client. In an embodiment, the second change is based on the first change. The change made by the second change may be to the element 701 or to a different element (of the asset 704 or of a different asset) affected by the first change.

In block 610, the database 106 is updated to include the second change. In embodiments, the database 106 is updated by synchronizing the database and data of the client 102b. In embodiments according to the invention, only the change or changes to the element 701 (or the other element) are provided to the database 106 by the client 102b: the entire, updated element—or the entire, updated asset—is not provided to the database by the client 102b.

The second change can be provided to the client 102a, by synchronizing the database 106 and data of the client 102a, by synchronizing the database and data of the client 102a.

In the manner just described, the clients 102a and 102b interoperate with each other through changes to the database 106 to collaboratively generate content (the virtual environment 702 and object 703). In an embodiment, one of the client applications 102a-n (FIG. 1) can render the virtual environment 702 for different types of client devices 103a-n (which may be referred as heterogeneous client devices) and adapt the rendering according to the respective hardware and software capabilities of the client devices.

Thus, in essence, instead of a client loading an asset to local memory, the asset is loaded from the database 106 across a network to the client; and, when a change is made, instead of saving the change to local memory, the change is saved across the network to the database. However, a client can make and register (list) multiple changes to an asset before saving any of the changes to the database 106. In other words, a client can save a single change to the database 106, or it can save a group of changes to the database. In an embodiment, the client can save changes to a database at a rate that corresponds to how the virtual environment is to be rendered and displayed. For example, in a video or gaming application that renders and displays scenes at the rate of 60 frames per second, clients may save changes at the rate of 60 times per second.

Depending on the type of client, a change to an element provided to the client does not necessarily trigger another change to either that element or another element. In general, in response to being provided a change to an element of an asset, a client 102a-n can make another change to that element, and update the database 106 to include the other change; make a change to another element of the asset, and update the database to include the change to the other element; use the element including any change in some type of operation that does not cause another change to the element; render the element/asset; and/or display the element/asset.

Example Computing System

Figure 8:
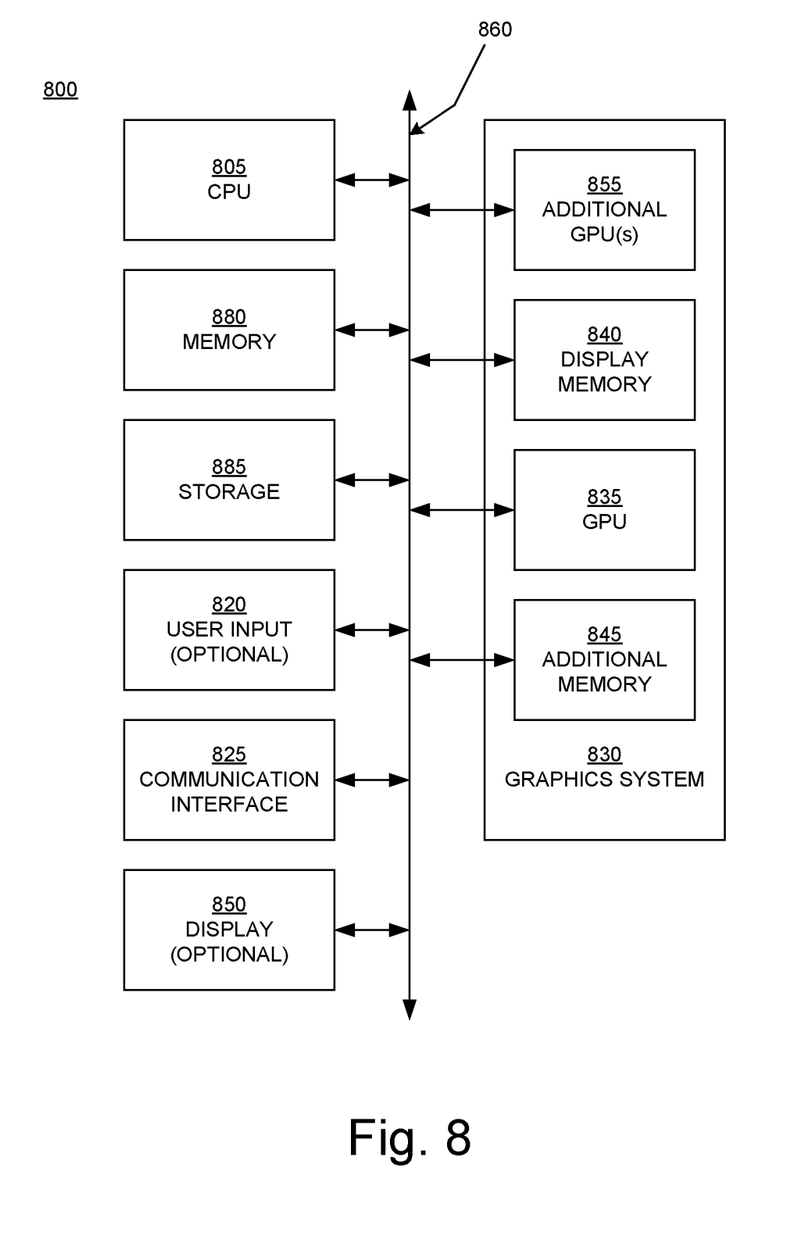
FIG. 8 is a block diagram illustrating an example computing system upon which embodiments according to the present invention can be implemented.

FIG. 8 is a block diagram illustrating an example computing system 800 upon which embodiments according to the present invention can be implemented. The computing system 800 may be, but is not limited to, a computer. The client devices 103a-n and the server system 105 can be implemented using the computing system 800. However, the client devices 103a-n and the server system 105 may not include all of the components of the computing system 800, and/or may include components in addition to those described below.

FIG. 8 is a block diagram of an example of a computing system 800 capable of implementing embodiments according to the present invention. In the example of FIG. 8, the computing system 800 includes a central processing unit (CPU) 805 for running software applications and optionally an operating system. Memory 810 stores applications and data for use by the CPU 805. Storage 815 provides non-volatile storage for applications and data and may include fixed disk drives, removable disk drives, flash memory devices, and CD-ROM, DVD-ROM or other optical storage devices.

With reference also to FIG. 1, the memory 810 and/or the storage 815 includes non-transitory computer-readable media having computer-executable components for implementing the clients 102a-n or the server 104, depending on the implementation.

The user input 820 of FIG. 8 includes devices that communicate user inputs from one or more users to the computing system 800 and may include keyboards, mice, joysticks, touch screens, and/or microphones. The communication or network interface 825 allows the computing system 800 to communicate with other computing systems via an electronic communications network, including wired and/or wireless communication and including the Internet. The display device 850 is any device capable of displaying visual information in response to a signal from the computing system 800. The components of the computing system 800, including the CPU 805, memory 810, data storage 815, user input devices 820, communication interface 825, and the display device 850, are connected via one or more data buses 860.

In the FIG. 8 embodiment, a graphics system 830 is connected with the data bus 860 and the components of the computing system 800. The graphics system 830 may include a physical graphics processing unit (GPU) 835 and graphics memory. The GPU 835 generates pixel data for output images from rendering commands. The physical GPU 835 can be configured as multiple virtual GPUs that are used in parallel (concurrently) by a number of applications executing in parallel.

Graphics memory may include a display memory 840 (e.g., a framebuffer) used for storing pixel data for each pixel of an output image. In another embodiment, the display memory 840 and/or additional memory 845 are part of the memory 810 and are shared with the CPU 805. Alternatively, the display memory 840 and/or additional memory 845 can be one or more separate memories provided for the exclusive use of the graphics system 830.

In another embodiment, graphics processing system 830 includes one or more additional physical GPUs 855, similar to the GPU 835. Each additional GPU 855 is adapted to operate in parallel with the GPU 835. Each additional GPU 855 generates pixel data for output images from rendering commands. Each additional physical GPU 855 can be configured as multiple virtual GPUs that are used in parallel (concurrently) by a number of applications executing in parallel.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The example methods described and/or illustrated herein may also omit one or more of the steps described or illustrated herein or include additional steps in addition to those disclosed.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosure.

Embodiments according to the invention are thus described. While the present disclosure has been described in particular embodiments, it should be appreciated that the invention should not be construed as limited by such embodiments, but rather construed according to the below claims.

What is claimed is:

1. A system, comprising:
one or more processing units coupled to memory having stored therein at least one database that stores data representative of assets of a scene; and
one or more communication interfaces coupled to the memory and operable for bidirectional communication with a plurality of different types of applications that interoperate with each other through changes to the at least one database, the one or more communication interfaces to communicate requests from the applications for subscriptions to receive one or more changes to subsets of the assets of the scene;

wherein changes corresponding to at least one asset of the assets of the scene made using one or more applications of the applications accessing the scene are saved to the at least one database and different applications of the applications are notified, using one or more notifications, of different sets of the changes corresponding to the at least one asset based at least on the different applications having been granted different subscriptions of the subscriptions to different subsets of the subsets of the assets of the scene, wherein the different sets of the changes corresponding to the at least one asset cause, based at least on the one or more notifications, the different applications to determine different values of one or more properties of a same synchronized object composed of a plurality of the assets and to render the same synchronized object in the scene using the different values, and further wherein one or more representations of one or more of the assets in the at least one databases comprises three-dimensional data.

2. The system of claim 1, wherein the one or more properties are defined using the assets.

3. The system of claim 1, wherein the one or more properties affect one or more of an appearance, a position, or an orientation of the same synchronized object in a virtual environment.

4. The system of claim 1, wherein the different sets of the changes corresponding to the at least one asset effect changes to different properties of the at least one asset with respect to the different applications.

5. The system of claim 1, wherein the one or more properties are defined across a plurality of objects.

6. The system of claim 1, wherein the different applications are notified of the different sets of the changes includes transmitting the different sets of the changes to the different applications.

7. The system of claim 1, wherein at least some of the subscriptions to receive changes are to different subsets of one or more layers of a plurality of layers that collectively define properties of objects, and a layer of the one or more layers defines a plurality of objects corresponding to a plurality of leaves of a transformation hierarchy.

8. The system of claim 7, wherein the one or more changes are to one or more first layers of a plurality of layers that collectively define properties of objects, at least one first object of the objects inherits one or more first properties from the one or more first layers, at least one second object of the objects inherits one or more second properties from one or more second layers of the plurality of layers, each layer of the plurality of layers defines the properties for the objects corresponding to a plurality of leaves of a transformation hierarchy.

9. The system of claim 1, wherein the changes are to a layer of a plurality of layers that collectively define properties of the scene representing a virtual environment, the scene includes a plurality of objects, and the layer defines the properties for the plurality of objects corresponding to a plurality of leaves of a transformation hierarchy.

10. The system of claim 1, wherein a first application of the different applications is notified regarding all of the changes and a second application of the different applications is notified regarding less than all of the changes.

11. The system of claim 1, wherein the applications are presenting the scene and the one or more notifications being filtered causes a second subset of the applications accessing the scene to present the scene without the one or more changes.

12. The system of claim 11, wherein at least one application of the different types of applications is selected from a group consisting of:
a physics simulation application;
an artificial intelligence application;
a global illumination application;
a game engine;
an animation tool;
a computer graphics application;
a renderer;
a graphics editor;
a virtual reality application;
an augmented reality application; and
a scripting application.

13. The system of claim 1, wherein a plurality of changes made by the one or more applications to the one or more assets in the at least one database are accumulated in a list, wherein the plurality of changes in the list are saved to the at least one database periodically.

14. The system of claim 1, wherein the one or more processing units execute a renderer that assembles objects to generate a frame comprising a render of the scene, wherein the system is communicatively coupled to a plurality of different types of client devices having different capabilities, and wherein the renderer assembles the scene for each client device of the client devices according to a capability of said each client device.

15. The system of claim 14, wherein a plurality of changes made by the one or more applications to the one or more assets in the at least one database are saved to the at least one database at a rate that corresponds to a rate at which the renderer generates frames.

16. A method, comprising:
at one or more servers that store at least one database comprising assets of a scene, wherein the assets comprise one or more elements:
receiving, from a first client of clients accessing the scene, a request for one or more subscriptions to receive one or more changes to one or more subsets of one or more of the assets of the scene;
receiving changes to at least one asset of the assets of the scene, the changes to the at least one asset generated using at least a second client of the clients accessing the scene;
updating the at least one of the assets of the scene in the at least one database to include the changes to the at least one asset; and
notifying, using one or more notifications from the one or more servers, different clients of the clients of different sets of the changes based at least on the first client being granted at least one subscription of the one or more subscriptions to receive the one or more changes to the one or more subsets of the assets of the scene, wherein the different sets of the changes to the at least one asset cause, based at least on the one or more notifications, the different clients to determine different values of one or more properties of a same synchronized object composed of a plurality of the assets and to render the same synchronized object in the scene using the different values.

17. The method of claim 16, wherein the first client identified the one or more subsets of the one or more assets in a request for the at least one subscription.

18. The method of claim 16, wherein the one or more servers refrain from providing the changes to a plurality of clients based at least on the plurality of clients lacking subscriptions that correspond to the one or more subsets of the assets.

19. The method of claim 16, wherein said receiving the one or more changes and said updating the one or more subsets in the at least one database to include the one or more changes comprise synchronizing the at least one database and data of the second client.

20. The method of claim 16, further comprising synchronizing the at least one database and data of the clients after said updating the at least one database to include the changes.

21. The method of claim 16, wherein the notifying is performed per client according to subscriptions to receive changes to the one or more subsets.

22. The method of claim 16, at least some subscriptions of the one or more subscriptions are to different subsets of one or more layers of a plurality of layers that collectively define properties of objects.

23. The method of claim 16, wherein the one or more changes are to one or more first layers of a plurality of layers that collectively define properties of objects, at least one first object of the objects inherits one or more first properties from the one or more first layers, and at least one second object of the objects inherits one or more second properties from one or more second layers of the plurality of layers.

24. The method of claim 16, wherein the one or more changes are to a layer of a plurality of layers that collectively define properties of objects, and the one or more changes correspond to a plurality of the objects.

25. The method of claim 16, further comprising resolving conflicts between changes to the at least one database according to a ranking assigned to applications that are sources of the changes.

26. The method of claim 16, wherein the at least one database comprises a plurality of assets, and wherein a set of the assets from the plurality of assets comprises a virtual scene when assembled.

27. The method of claim 16, wherein the clients correspond to applications selected from a group of types of applications consisting of:
a physics simulation application;
an artificial intelligence application;
a global illumination application;
a game engine application;
an animation tool;
a computer graphics application;
a renderer application;
a graphics editor application;
a virtual reality application;
an augmented reality application; and
a scripting application.

28. A processor comprising:
one or more circuits to:
store in, at least one database assets comprising three-dimensional data, the assets forming a virtual scene;
process one or more communications received using one or more sockets coupled to the at least one database and operable for bidirectional communication with clients accessing the virtual scene;
receive, from a first client of the clients, one or more requests for one or more subscriptions to receive one or more changes to one or more subsets of one or more of the assets of the virtual scene; and
perform operations to synchronize data of the assets and data of the clients accessing the virtual scene;
wherein the operations comprise:
receiving changes to one or more elements of an asset in the one or more subsets, the changes to the one or more elements generated using at least a second client of the clients accessing the virtual scene;
updating the one or more elements in the at least one database to include the changes to the one or more elements; and
notifying, using one or more notifications, different clients of the clients accessing the virtual scene of different sets of the changes to the one or more elements based at least on the first client having the one or more subscriptions to receive the one or more changes to the one or more subsets, wherein the different sets of the changes to the one or more elements cause, based at least on the one or more notifications, the different clients to determine different values of one or more properties of a same synchronized object composed of a plurality of the assets and to render the same synchronized object in the virtual scene using the different values.

29. The processor of claim 28, wherein the operations further comprise:
the at least one database and data for the first client being synchronized via the one or more sockets to include the one or more changes in the at least one database, after the one or more changes are generated using the second client.

30. The processor of claim 28, wherein at least some subscriptions of the one or more subscriptions are to different subsets of one or more layers of a plurality of layers that collectively define properties of objects.

31. The processor of claim 28, wherein the one or more circuits are further operable for resolving conflicts between changes to the assets in the at least one database according to a ranking assigned to the clients that are sources of the changes.

32. The processor of claim 28, wherein the first client and the second client are different types of clients selected from a group of types of clients consisting of:
a physics simulation application;
an artificial intelligence application;
a global illumination application;
a game engine;
an animation tool;
a computer graphics application;
a renderer;
a graphics editor;
a virtual reality application;
an augmented reality application; and
a scripting application.

33. The processor of claim 28, wherein the one or more circuits are further to assemble the assets in the at least one database to generate a frame comprising a render of the virtual scene, wherein the clients comprise devices having different capabilities, and wherein the frame is generated for a devices of the devices according to capabilities of the device.

34. The processor of claim 28, wherein the one or more changes are to one or more first layers of a plurality of layers that collectively define properties of objects, at least one first object of the objects inherits one or more first properties from the one or more first layers, and at least one second object of the objects inherits one or more second properties from one or more second layers of the plurality of layers.

35. The processor of claim 28, wherein the one or more changes are to a layer of a plurality of layers that collectively define properties of objects, and the one or more changes correspond to a plurality of the objects.

36. The processor of claim 28, wherein the one or more circuits are to provide, based at least on the subscriptions, different sets of the clients accessing the virtual scene to receive different sets of changes to a same assets of the virtual scene.

37. A system comprising:
one or more servers, comprising:
at least one database that stores assets comprising three-dimensional data used for generating a virtual scene; and
one or more circuits to:
receive, from clients accessing the virtual scene, requests for subscriptions to receive one or more changes to subsets of one or more of the assets of the virtual scene;
synchronize changes corresponding to at least one asset of the assets made by at least one client coupled to the server and data of the at least one asset to include the changes in the at least one database; and
notifying, using one or more notifications, different clients of the claims of different sets of the changes corresponding to the at least one asset in accordance with the subscriptions to synchronize the different sets of the changes corresponding to the at least one asset with data of the different clients based at least on the different clients having been granted different subscriptions of the subscriptions to different subsets of the subsets of the one or more assets of the virtual scene, wherein the different sets of the changes corresponding to the at least one asset cause, based at least on the one or more notifications, the different clients to determine different values of one or more properties of a same synchronized object composed of a plurality of the assets and to render the same synchronized object in the virtual scene using the different values.

38. The system of claim 37, wherein the one or more circuits are further to resolve conflicts between changes to the assets according to a ranking assigned to the clients that are sources of the changes.

39. The system of claim 37, wherein the clients comprise different types of clients selected from a group of types of clients consisting of:
a physics simulation application;
an artificial intelligence application;
a global illumination application;
a game engine;
an animation tool;
a computer graphics application;
a renderer;
a graphics editor;
a virtual reality application;
an augmented reality application; and
a scripting application.

40. The system of claim 37, wherein the clients comprise clients that are subscribers to one or more selected assets in the at least one database, wherein the subscribers are notified when a change is made to an asset in the at least one database that they subscribe to.

41. The system of claim 37, wherein the clients comprise respective plug-ins to communicate with the at least one database.

42. A system comprising:
one or more processing units to implement at least one client application of a plurality of client applications accessing a virtual environment, the at least one client application to:
interoperate with others of the plurality of client applications to produce and modify assets of the virtual environment through changes to the assets;
request one or more subscriptions to receive one or more changes to one or more subsets of one or more of the assets;
receive one or more notifications corresponding to a set of changes of different sets of changes to at least one asset of the assets, wherein different client applications of the plurality of client applications are notified of the different sets of changes based at least on the different client applications having been granted different subscriptions to different subsets of the subsets of the one or more assets, and wherein the different sets of the changes corresponding to the at least one asset cause, based at least on the one or more notifications, the different client applications to determine different values of one or more properties of a same synchronized object composed of a plurality of the assets and to render the same synchronized object in the virtual environment using the different values; and
render one or more views of the virtual environment using the one or more subsets of the one or more of the assets, the one or more views including the same synchronized object.

43. The system of claim 42, further comprising at least one database configured to store the assets, wherein the changes are saved to the at least one database and provided from the at least one database to one or more of the plurality of client applications based at least on the one or more subscriptions.

44. The system of claim 42, wherein at least some subscriptions of the one or more subscriptions are to different subsets of one or more layers of a plurality of layers that collectively define properties of objects.

45. The system of claim 42, wherein the plurality of client applications comprise types of applications selected from a group consisting of:
a physics simulation application;
an artificial intelligence application;
a global illumination application;
a game engine;
an animation tool;
a computer graphics application;
a renderer;
a graphics editor;
a virtual reality application;
an augmented reality application; and
a scripting application.

46. The system of claim 42, wherein information that identifies client applications of the plurality of client applications as having subscriptions to the at least one asset is associated with the at least one asset, wherein the one or more changes are provided to the client applications based at least on the subscriptions.

* * * * *